(12) United States Patent
Mundon

(10) Patent No.: US 11,598,308 B2
(45) Date of Patent: Mar. 7, 2023

(54) EXTENSION SPRING AND FAIRLEAD BASED POWER TAKE-OUT FOR WAVE POWER SYSTEMS

(71) Applicant: Oscilla Power, Inc., Seattle, WA (US)

(72) Inventor: Timothy Mundon, Seattle, WA (US)

( * ) Notice: Subject to any disclaimer, the term of this patent is extended or adjusted under 35 U.S.C. 154(b) by 0 days.

(21) Appl. No.: 17/319,040

(22) Filed: May 12, 2021

(65) Prior Publication Data

US 2021/0355906 A1 Nov. 18, 2021

Related U.S. Application Data

(60) Provisional application No. 63/023,691, filed on May 12, 2020.

(51) Int. Cl.
*F03B 13/20* (2006.01)

(52) U.S. Cl.
CPC .................................. *F03B 13/20* (2013.01)

(58) Field of Classification Search
None
See application file for complete search history.

(56) References Cited

U.S. PATENT DOCUMENTS

| 3,638,358 | A | * | 2/1972 | Mason | ..................... | E05F 11/06 |
| | | | | | | 74/89.18 |
| 5,176,552 | A | * | 1/1993 | Kuboyama | ............. | F03B 13/18 |
| | | | | | | 441/16 |
| 2012/0153624 | A1 | * | 6/2012 | Sampaio | ................. | F03B 13/16 |
| | | | | | | 290/53 |
| 2015/0266549 | A1 | | 9/2015 | Qu | | |
| 2017/0002789 | A1 | | 1/2017 | Nair et al. | | |
| 2017/0226984 | A1 | | 8/2017 | Gregory | | |
| 2021/0354799 | A1 | * | 11/2021 | Mundon | ................... | B63J 3/04 |

FOREIGN PATENT DOCUMENTS

WO 2020/010342 1/2020

OTHER PUBLICATIONS

Thomas "PCT International Search Report for International Application No. PCT/US2021/032100" dated Oct. 21, 2021, 2 pages.
Thomas "Written Opinion of the International Searching Authority for International Application No. PCT/US2021/032100" dated Oct. 21, 2021, 5 pages.

* cited by examiner

*Primary Examiner* — Tulsidas C Patel
*Assistant Examiner* — S. Mikailoff
(74) *Attorney, Agent, or Firm* — Intellectual Strategies

(57) ABSTRACT

A system includes a float including a drivetrain, a reaction structure coupled to the drivetrain by a tendon, and an extension spring having a first end coupled to a fixed point on the tendon and a second end configured to be disposed at a fixed location relative to the drivetrain. The extension spring is configured to experience an elastic force in response to tension on the first end of the extension spring away from the drivetrain.

7 Claims, 5 Drawing Sheets

EXTENSION SPRING AND FAIRLEAD BASED POWER TAKE-OUT FOR WAVE POWER SYSTEMS

CROSS-REFERENCE TO RELATED APPLICATIONS

This application claims the benefit of U.S. Provisional Application No. 63/023,691, filed on May 12, 2020, which is incorporated by reference herein in its entirety.

BACKGROUND

This disclosure relates generally to wave energy systems. More specifically, this disclosure relates to compact power take-out (PTO) apparatuses for wave energy systems.

SUMMARY

The subject matter of the present application has been developed in response to the present state of the art, and in particular, in response to the problems and disadvantages associated with conventional deposition that have not yet been fully solved by currently available techniques. Accordingly, the subject matter of the present application has been developed to provide embodiments of a system, an apparatus, and a method that overcome at least some of the shortcomings of prior art techniques.

Disclosed herein is a system. The system includes a float including a drivetrain, a reaction structure coupled to the drivetrain by a tendon, and an extension spring having a first end coupled to a fixed point on the tendon and a second end configured to be disposed at a fixed location relative to the drivetrain. The extension spring is configured to experience an elastic force in response to tension on the first end of the extension spring away from the drivetrain. The preceding subject matter of this paragraph characterizes example 1 of the present disclosure.

The system further includes a tendon-spring coupling attaching the tendon to the extension spring at the fixed point. The preceding subject matter of this paragraph characterizes example 2 of the present disclosure, wherein example 2 also includes the subject matter according to example 1, above.

The system further includes a fairlead configured to couple the second end of the extension spring to the fixed location. The preceding subject matter of this paragraph characterizes example 3 of the present disclosure, wherein example 3 also includes the subject matter according to any one of examples 1-2, above.

The fairlead is configured to be fully retractable into the float. The preceding subject matter of this paragraph characterizes example 4 of the present disclosure, wherein example 4 also includes the subject matter according to any one of examples 1-3, above.

The tendon is configured to wrap around a drum in the float. The preceding subject matter of this paragraph characterizes example 5 of the present disclosure, wherein example 5 also includes the subject matter according to any one of examples 1-4, above.

The spring is configured to wrap around the drum in the float. The preceding subject matter of this paragraph characterizes example 6 of the present disclosure, wherein example 6 also includes the subject matter according to any one of examples 1-5, above.

The reaction structure is configured to move from an undeployed position to a deployed position. The preceding subject matter of this paragraph characterizes example 7 of the present disclosure, wherein example 7 also includes the subject matter according to any one of examples 1-6, above.

The deployed position comprises that the reaction structure is coupled to the via the tendon. The preceding subject matter of this paragraph characterizes example 8 of the present disclosure, wherein example 8 also includes the subject matter according to any one of examples 1-7, above.

The undeployed position comprises that the reaction structure is directly coupled to the float. The preceding subject matter of this paragraph characterizes example 9 of the present disclosure, wherein example 9 also includes the subject matter according to any one of examples 1-8, above.

The tendon is configured to wrap around a drum in the float. The preceding subject matter of this paragraph characterizes example 10 of the present disclosure, wherein example 10 also includes the subject matter according to any one of examples 1-9, above.

The float is an unmanned underwater vehicle (UUV). The preceding subject matter of this paragraph characterizes example 11 of the present disclosure, wherein example 11 also includes the subject matter according to any one of examples 1-10, above.

The UUV is an autonomous underwater vehicle (AUV). The preceding subject matter of this paragraph characterizes example 12 of the present disclosure, wherein example 12 also includes the subject matter according to any one of examples 1-11, above.

The one or more PTO units is coupled to the flotation structure. The preceding subject matter of this paragraph characterizes example 13 of the present disclosure, wherein example 13 also includes the subject matter according to any one of examples 11-12, above.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

Throughout the description, similar reference numbers may be used to identify similar elements.

DETAILED DESCRIPTION

Figure 1:
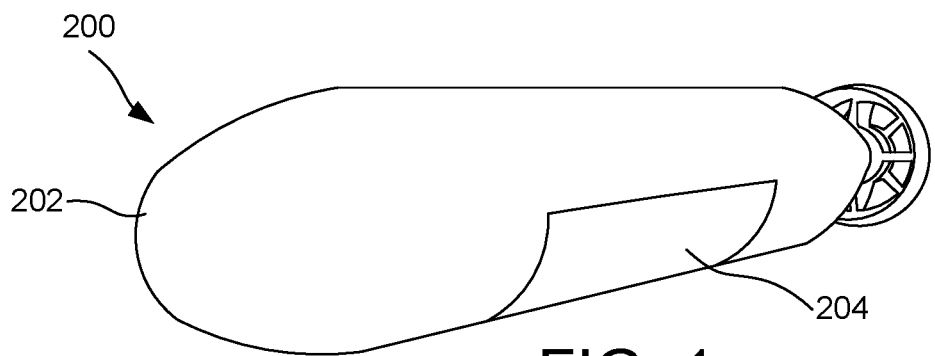
FIG. 1 depicts an unmanned underwater vehicle (UUV), according to one or more embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

There is a growing interest in small scale wave energy systems for remote and distributed ocean applications. However, scaling down of known and well understood wave energy archetypes creates some challenges with regards to the method for power extraction. For point absorber architectures, the required relative displacement of the two bodies (seafloor and float, or reaction structure and float) is related closely to the wave height, not the device size. Thus, although the device may reduce in size, the power take-out (PTO) must still manage the same relative displacement.

Figure 4:
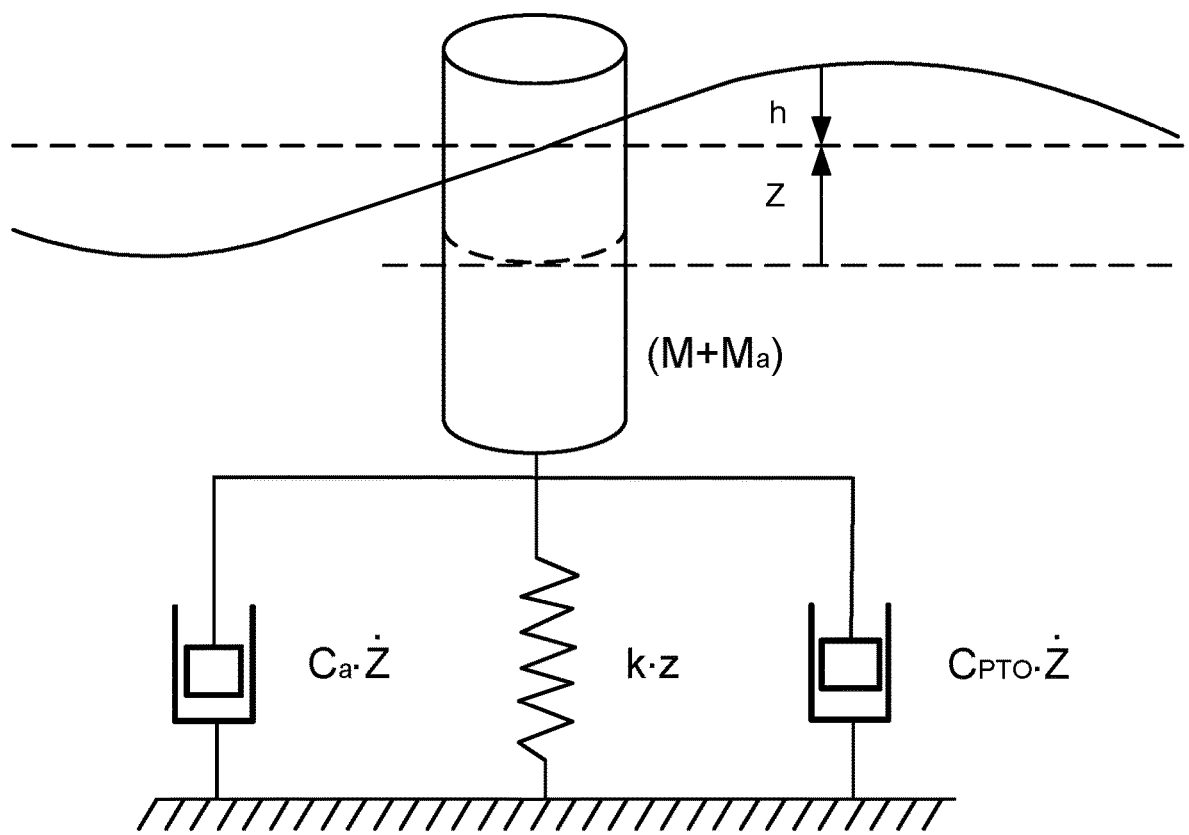
FIG. 4 depicts a schematic diagram of a point absorber with a spring and damping, according to one or more embodiments of the present disclosure.

A second challenge with reduced-size point absorber systems, particularly two-body systems, is the implementation of a spring force that acts to support the mass of the reaction structure and return the system to its equilibrium. FIG. 1 shows the well-known free body diagram of a point absorber wave energy converter (WEC), where, the $C_a \cdot \dot{z}$ term represents the hydrodynamic damping, the k·z term represents the aforementioned spring and the $C_{PTO} \cdot \dot{z}$ term represents the power take out. z and ż represent displacement and velocity, respectively. Implementing this spring term in practice can be particularly challenging when the relative displacement becomes very large. In larger WECs, pneumatic or hydropneumatics systems can be used to implement this spring force with a high-power density. As WECs become smaller, there is a need to rely on mechanical springs as the losses in pneumatic or hydraulic systems become too large; however, mechanical springs can be heavy when designed to operate with very long relative travel. For Reference see FIG. 4 for details.

Embodiments described herein include a compact rotary-style power take-out, with an in-line concentric mechanical spring, intended for use in smaller (10-100 W) size point absorber type wave energy devices. In some embodiments, the design incorporates a fairlead into one end of the spring, allowing the spring to be fully retracted into the PTO. For a two-body style WEC, this enables the reaction structure to be fully recovered or deployed by the PTO, enabling autonomous deployment and recovery operations.

In some embodiments, the design presented is scalable from very low powers and forces to around 100 W or so and can be used in single-tendon as well as multi-tendon implementations of both single-body and two-body point absorber concepts. Many different types of WECs may be used including those shown in FIGS. 1-3 (unmanned underwater vehicles or UUVs), FIG. 5 (a multi-tendon single-body point absorber), and FIG. 6 (a single-tendon, two-body WEC).

UUVs can benefit from incorporation of built-in energy harvesting solutions to extend or expand at least one of the following, among others: performance capabilities, lifetime, range, communication capability, and/or remote operation/control capability. Others include, but are not limited to floating or submerged buoys, floating or sub-surface platforms that support various types of equipment, surface or under-water vehicles. While some of the description below focuses on UUVs, it should be understood the embodiments of the inventions described below may be incorporated into any one of the systems described in the previous sentence, or any other ocean-based system. Other embodiments described herein do not utilize UUVs to be implemented.

UUVs, which include autonomous underwater vehicles (AUVs) and Remote Operated underwater Vehicles (ROVs), are gaining increasing acceptance and starting to be applied to several uses. Adoption of UUV technology has recently experienced rapid growth, fueled by possibilities opened up through technology advances and growing awareness of these capabilities by users and customers. Coupled with advances in modern robotics, UUVs are performing maritime tasks in days that used to take fleets of ships months to complete. UUVs are particularly useful as unmanned survey platforms, and typically have an array of on-board sensors to collect data for a variety of applications. They are used widely for a variety of commercial applications including persistent ocean remote condition monitoring, marine search and rescue, marine wildlife monitoring, underwater construction, aquaculture, surveillance, and inspections of subsea infrastructure. In addition, there are a number of critical military operations that are increasingly reliant on UUVs including mine countermeasures, surveillance, submarine detection, etc. In both commercial and military arenas, UUVs offer the potential to be cheaper, less complex, safer and more reliable than human-powered vehicles. The US Navy, in particular, is starting to restructure its operations significantly to take advantage of the resilience, surveillance, cost savings, and stealth benefits of operating many small UUVs, as compared to large ships.

Although UUVs are seeing increasing adoption, they have not yet reached their full potential. While ROVs draw power from an umbilical connection and are remotely operated from a surface vessel, AUVs are autonomous and untethered systems and require a power source to be carried onboard. Available power is therefore a key constraint for most AUVs. It has been shown that should greater power be available on board AUVs from more compact systems, the most desired increase in functionality is longer mission durations, higher sampling rate, more sensing capability and improved communication capability.

Generally, an on-board battery is used for all power demands, including propulsion, communication, sensors, and data acquisition. Lithium batteries are the most common type of battery used in AUVs, and they can allow operation for a number of hours, with the mission duration greatly influenced by the vehicle speed or data collection rate. An AUV is typically built around a given battery capacity which can occupy up to 75% of the interior of the AUV. Extended duration missions require the AUV to be recovered and batteries to be recharged or swapped, generally requiring the intervention of a support vessel. Reducing the number of recoveries & redeployments for a given mission duration is an obvious driver to reduce costs and increase safety.

The approach we describe to mitigate this problem is to incorporate some self-recharging capability within the AUV. This allows the AUV to extract energy from its surrounding environment and eliminates the need to recover the vehicle for recharging until the mission is complete, thereby allowing a significant increase to the physical range of operation. Furthermore, this can result in an increased availability of power for internal systems which can allow greater capabilities to be incorporated or utilized within the AUV. A number of approaches have been attempted to incorporate on-board energy harvesting on AUVs with limited success.

Wave energy could be an attractive solution for AUV powering. Wave energy has a high energy density, is available anywhere in the ocean, can potentially be harnessed without rising above the ocean surface, and is available 24 hours a day. Wave generated propulsion is demonstrated on commercially available systems, e.g., waveglider. However, the efforts on electricity generation for AUV's from wave energy to date have focused on rocking or gyroscopic systems and resulted in less than 1 Watt of average power, an order of magnitude less power than the described approach.

By including a wave powered recharging capability this will allow the AUV to operate for significantly longer periods of time, potentially indefinitely. This reduces the cost per mission, allows additional sensors and communications, enables more complex missions, and most importantly, will allow substantially more ocean science to be completed. The approach described is scalable and adaptable and can potentially be applied to any AUV. This approach is described for a torpedo shaped AUV as this is the dominant form of AUV in use, however the described principle is applicable to any arbitrary shaped AUV.

Under nominal operations the AUV would operate normally and with an identical external profile. When the AUV desires to recharge, the AUV body will reconfigure into a two-body, wave energy converter through the lowering of a reaction structure. While the reaction structure may be internal to, external to, or part of the body of the AUV, in one embodiment, the reaction structure may be part of or align with the exterior casing of the AUV.

Referring now to FIG. 1, an unmanned underwater vehicle (UUV) as part of a system 200 is shown. Although the system 200 is shown and described with certain components and functionality in the following paragraphs, other embodiments of the system 200 may include fewer or more components to implement less or more functionality. The system 200 includes a float 202 (in this case, an unmanned underwater vehicle (UUV)). In some embodiments, the UUV may be an AUV or a ROV. In the illustrated embodiment, the UUV includes a propeller to allow the UUV to maneuver through the water. The UUV may include other systems that require power to function including, but not limited to, sensors, propulsion systems, communication systems, data acquisition systems.

The system 200 also includes a drivetrain or power take-out (PTO) unit (not visible). The system 200 also includes a reaction structure 204 configured to deploy from float 202. In the illustrated embodiment, the reaction structure 204 aligns with an exterior casing of the UUV. The deployable reaction structure 204 allows the UUV to maneuver and perform functions either in a deployed or undeployed position. As shown, the reaction structure 204 aligns with the float 202 for streamlined movement.

The system 200 also includes one or more tendons (not shown in FIG. 1). The one or more tendons connect the reaction structure 204 to the float 202. The reaction structure 204 may be configured to deploy at a depth below the float 202.

The system 200 further includes a drivetrain or power take-out (PTO) units (internal to the float). See FIGS. 7, 8, 9, and 10 for representative examples. The drivetrain may be coupled to the reaction structure 204, to the float 202, or coupled between the reaction structure 204 and the float 202.

The system further includes a control unit or a plurality of control units in some embodiments. The control unit (or controller) may include hardware or software that is capable of controlling the various features of the system 200 and performing functions of the system 200 as needed. In some embodiments, the control unit is coupled to the one or more drivetrains. The control unit may be configured to harness and convert energy from the waves on a surface of a body of water. The relative positioning of the float 202 and the reaction structure 204 connected by the tendon(s) 206 (not shown in FIG. 1, see FIG. 3), and movement caused by the waves on the float 202 allow for tensile forces (and other forces) to be harnessed from a drivetrain. The control unit may be configured to convert the wave energy for use in the other systems within the float 202.

Figure 2:
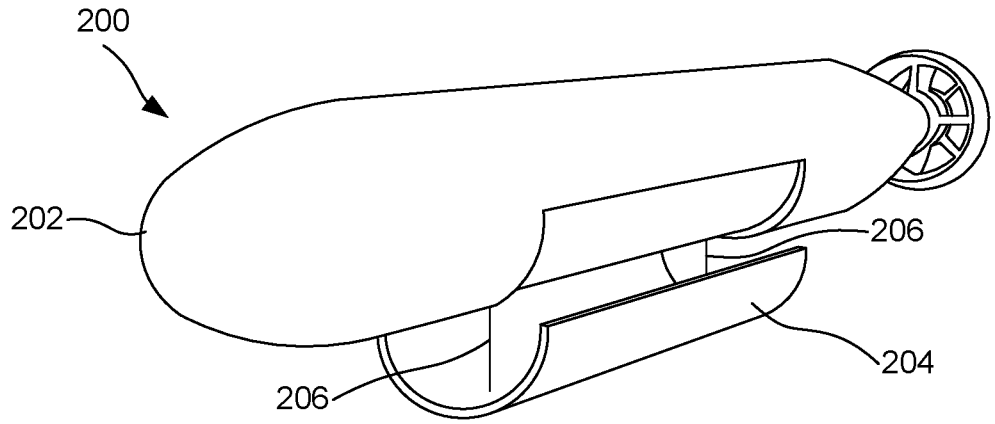
FIG. 2 depicts an unmanned underwater vehicle (UUV) with a reaction structure beginning to deploy, according to one or more embodiments of the present disclosure.

Referring now to FIG. 2, the reaction structure 204 is beginning to be deployed and lowered from the float 202. As depicted, the reaction structure 204 is being deployed below the body 202 but can be deployed in other directions in other embodiments.

Figure 3:
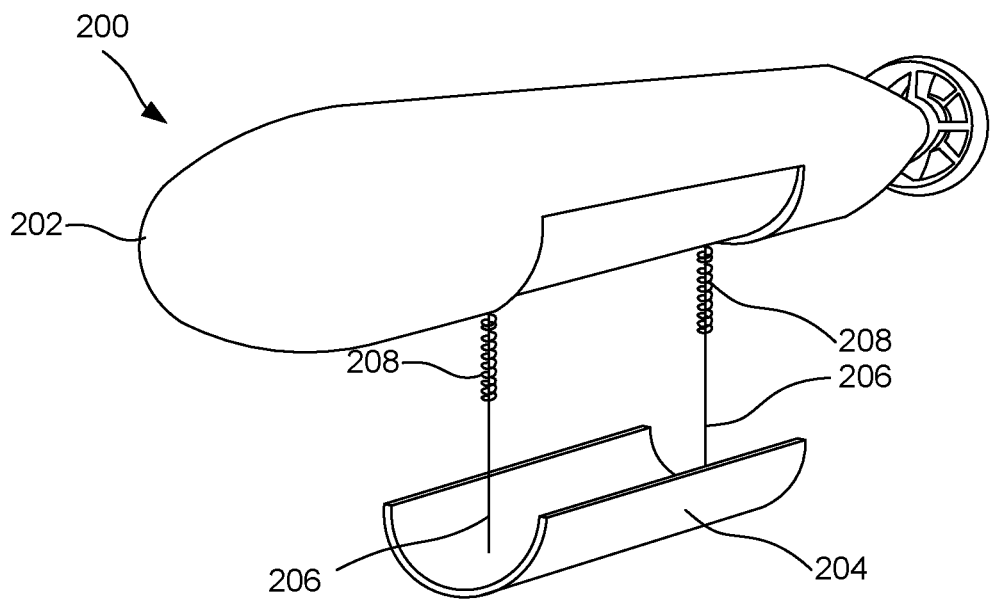
FIG. 3 depicts an unmanned underwater vehicle (UUV) with a reaction structure deployed, according to one or more embodiments of the present disclosure.

Referring now to FIG. 3, the reaction structure 204 is in a deployed position below the float 202. As shown, the system 200 can move back and forth between a deployed position (shown in FIG. 3) and an undeployed position (shown in FIG. 1) as needed. When recharging is needed, the float may deploy the reaction structure 204 and harness energy to recharge the systems without requiring the float to return to base.

As depicted, the reaction structure 204 is coupled to the float 202 by a pair of tendons 206. Also depicted are extension springs 208 which may be utilized to better harness the energy. In some embodiments, the spring (or extension spring 208) has a first end coupled to a fixed point on the tendon and a second end configured to be disposed at a fixed location relative to the drivetrain. The extension spring 208 is configured to experience an elastic force in response to tension on the first end of the extension spring away from the drivetrain.

In some embodiments, the reaction structure 204 can be altered (after lowering) to a different shape that may provide additional benefits from a performance standpoint. In such embodiments, additional means may be included in the reaction structure to facilitate realignment, expansion, etc. so as to facilitate the reaction structure 204 to be altered from a baseline shape to form a more hydrodynamically desirable shape. In some embodiments of the invention, this shape may be one that provides an increased effective drag coefficient in the upward direction relative to the downward direction. In some embodiments of the invention, the altered shape may provide increased added mass relative to the baseline shape.

In some embodiments, the UUV body will act as a float 202 and will be connected to the deployable reaction structure 204 below it, and use the wave generated relative movement of these two bodies to generate power. Wave particle motion reduces by the square of the depth and therefore the wave loads on the Float 202 will be substantially greater than those on the reaction structure, deployed a few meters below. Accordingly, the UUV will generate the most power when the float is at the surface of a body of water, however this is not a requirement for operation and by positioning the UUV some distance below the surface, but still in the presence of waves. The UUV can still generate power if positioned below the surface.

In very large ocean waves where there is a risk of damage at the surface, the AUV can enter the recharging configuration at some depth below the surface, where the energy is reduced. The production of power from the relative motion the reaction structure and the float is similar to a two-body wave energy converter. While charging, the AUV would be able to use its already existing systems, such as propulsion, buoyancy engine and navigation to autonomously maintain target charging depth, maintain heading and charge onboard batteries.

In some embodiments, a surface float (or flotation structure), separate from the UUV body may be deployed from the UUV such that it is this surface float that reacts against the reaction structure. This configuration may have the advantage that the surface float can have a shape suitable for optimal energy capture from the waves. In such embodiments, the UUV may or may not form or function as the reaction structure 204.

In the case where the UUV forms the reaction structure, the system may be capable of additional shape alterations that may allow it to function suitably as a reaction structure. In some embodiments, the PTO may be on the UUV body that forms the reaction structure.

In such embodiments, the system includes the same features as described above, however, the unmanned underwater vehicle (UUV) acts as the reaction structure and a flotation structure (or other float) is configured to deploy from a body of the UUV, and one or more tendons connecting the flotation structure to the body of the UUV.

The float 202 may have a buoyancy engine, as may be the case with some small units, or other means may be included to facilitate additional buoyancy. This may include a mechanism to expand the structure either mechanically and/or through the use of an airtight elastic membrane within (or on) the upper surface of the AUV can be inflated (through a $CO_2$ cartridge or similar).

The float may include an air bag either internal or external to the float. In one embodiment, the air bag could be on the exterior of the UUV. In another embodiment, the air bag would be on the inside and the outer UUV casing would hinge open as it is inflated. In the latter case, the UUV body can avoid any additional drag during operation when the airbag is deflated.

In some embodiments of the invention, controls and body mechanics may be included to alter the physical shape of the UUV body itself so that it can react more to the waves and capture a greater amount of energy from waves. In some embodiments, the water plane area of the structure may be increased by opening up one or more additional structures including, but not limited to fins, shields etc.

The reaction structure 204 and the float 202 may be connected in many ways, including with tendons 206 or with rigid connections. One embodiment that utilizes one or more tendons. When deployed, the recharging configuration would include either a single tendon 206 from the center of the UUV body connected to the reaction structure 204, or alternatively, two tendons 206, located axially along the float 202 connected to the reaction structure 204. The two-tendon configuration allows for both pitch and heave motion to be primary contributors to relative (power generating) motion. Additional motion in surge, sway and yaw will also result in some secondary power generation. Other embodiments may include more than two tendons 206.

In some embodiments, the reaction structure 204 will be stowed against the float 202 when not in use and then lowered below the float 202 to generate power. This naturally gives the reaction structure 204 a hemispherical or partial hemispherical shape when deployed. Similar shapes have been shown to provide greatly increased added mass compared to flat plates. Increasing the added mass of the reaction structure 204 greatly increases its performance.

In some embodiments, an UUV buoyancy engine can be used to control the overall submergence of the system while generating power in order to manage power and loads in larger sea states. It should be noted that this approach is a fail-safe approach, whereby if the tendon(s) were to fail, the AUV would remain on the surface and recoverable.

Figure 5:
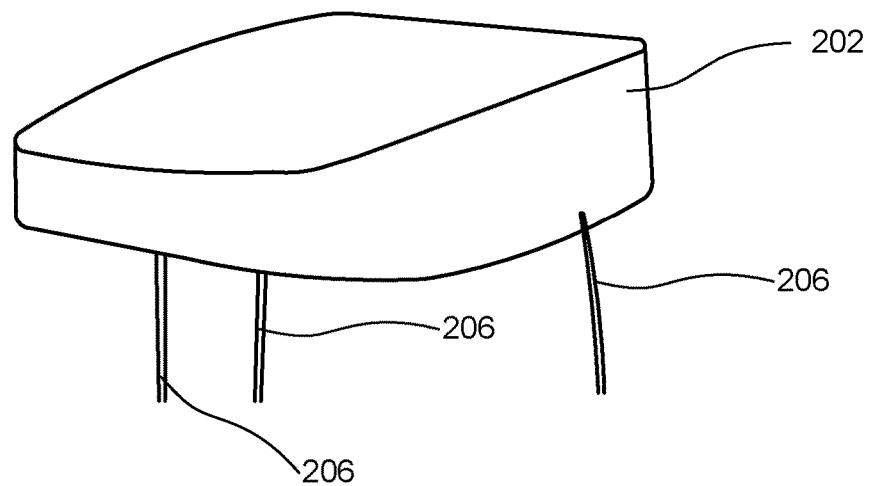
FIG. 5 depicts a float, according to one or more embodiments of the present disclosure.
Figure 6:
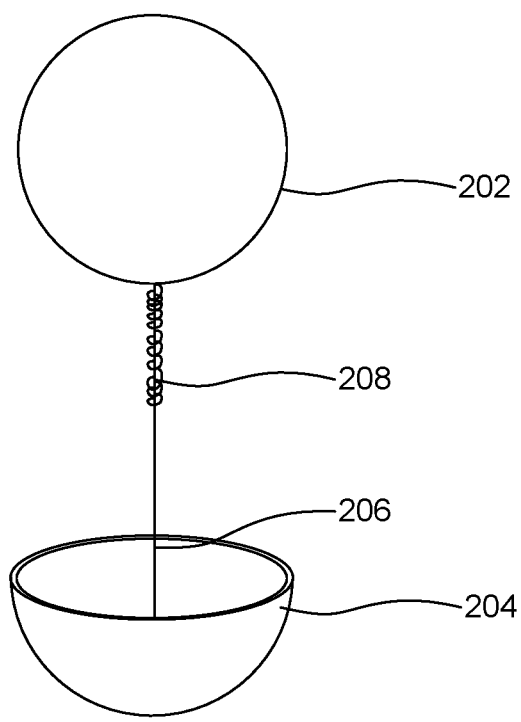
FIG. 6 depicts a float and reaction structure, according to one or more embodiments of the present disclosure.

Referring to FIG. 5, a float 202 including three tendons 206 is depicted. Referring to FIG. 6, a float 202 and reaction structure 204 is depicted with a single tendon 206 coupling them together including an extension spring 208. Such an apparatus is capable of harnessing tension as described herein.

The light weight of the reaction structure 204 relative to its area means that drag forces may become large relative to inertial forces and could mean that there will be a tendency for the tendons to experience snap loading. This can result in a risk of additional fatigue to the tendons 206. This can be mitigated in some embodiments by using variable geometry, such that the reaction structure 204 will fold inward on the downward travel, significantly reducing the drag area. This may be important in longer, larger waves where reaction forces are increasingly related to the reaction structure velocities. In smaller, shorter waves, reaction forces may be dominated by inertial forces, and in these cases the added mass terms may be relatively important.

In some embodiments, the UUV will have a somewhat limited buoyant restoring force when acting as a float, and especially when submerged, which will limit the power production. This can be improved by increasing the drag and added mass of the UUV body in heave by adding longitudinal features (fins) in the horizontal plane that will not impede normal streamwise flow when operating. This is not a requirement for the invention to function but can be used to improve the power performance.

As noted, the relative motion of the two bodies creates a useable force and displacement. This is converted into electrical energy through a compact power take-out (PTO). The choice of PTO in no way limits the scope of this invention and it is understood that the invention may be viable with many different types of PTO units. In some embodiments, the design of the PTO unit should be able to handle a long relative displacement between bodies to generate optimum power.

Figure 7:
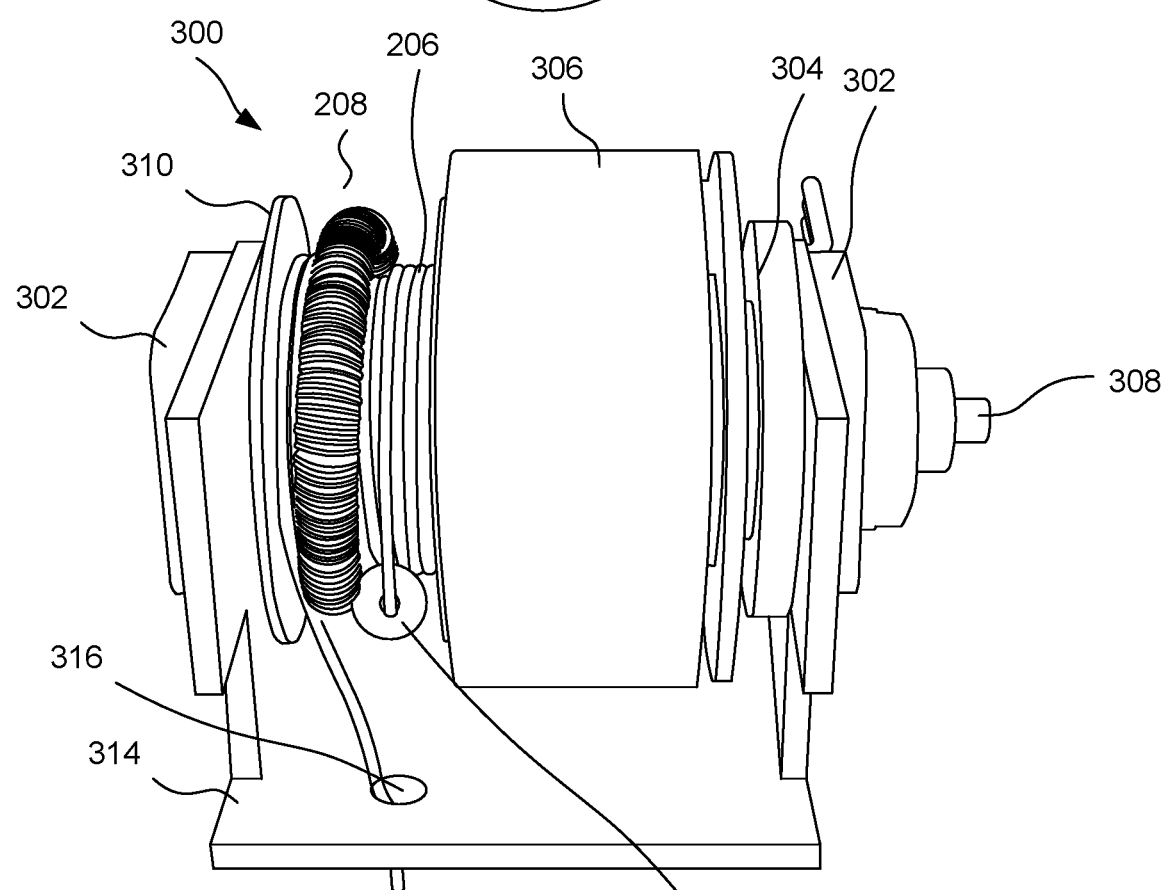
FIG. 7 depicts a view of a drivetrain or power take-out (PTO) unit, according to one or more embodiments of the present disclosure.
Figure 8:
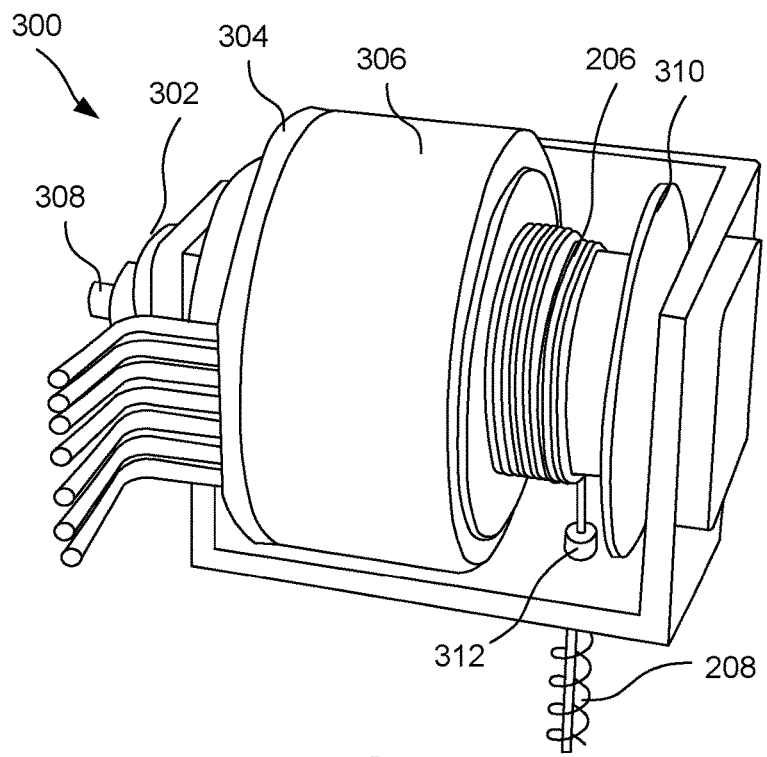
FIG. 8 depicts an isometric view a drivetrain or power take-out (PTO) unit, according to one or more embodiments of the present disclosure.

Referring now to FIGS. 7 and 8, a drivetrain and PTO unit are shown with a tendon 206 extending down to reaction structure (not shown). In the illustrated embodiments, a rotary approach is shown. In FIG. 7, the extension spring 208 and the fairlead 312 are shown in a retracted position (wound on the drum 310). In FIG. 8, the extension spring 208 and the fairlead 312 are shown unwound from the drum 310 such that the fairlead 312 is inserted into the opening of the support structure 314 and the extension spring 208 extends down the tendon 206.

The tendon 206 is connected to the reaction structure (not shown) at its lower end, while the upper end passes through a fairlead 312 and wraps around a small drum 310. The fairlead 312 is used to channel the line onto the drum 310 and prevent damage to the tendon 206. In the presence of waves, the float and reaction structure will oscillate relative to each other around the equilibrium point of the extension spring 208. This motion will therefore cause the drum 310 and the generator to rotate. The drum 310 is connected to a driveshaft 308 that is coupled to the generator (including a generator rotor 306, generator stator 304) and supported by bearings 302. The PTO unit 300 includes a support structure 314 on which the bearings 302 support the unit and the fairlead 312 fits into an opening 316 that couples the spring to the PTO unit 300. The other end of the spring 208 is coupled to a point on the tendon 206.

In some embodiments, the first end of the extension spring 208 is coupled to a fixed point on the tendon 206. This may be coupled to the tendon in a variety of ways that secures the end of the spring and is stable on the tendon 206 such that the location on the tendon 206 does not change. The second end is configured to be disposed at a fixed location relative to the drivetrain but will otherwise allow the tendon 206 to move freely relative to the second end. With a coil spring (as shown), the tendon 206 runs down the center of the spring allowing the spring to move relative to the tendon 206 except at the first end coupling.

Figure 9:
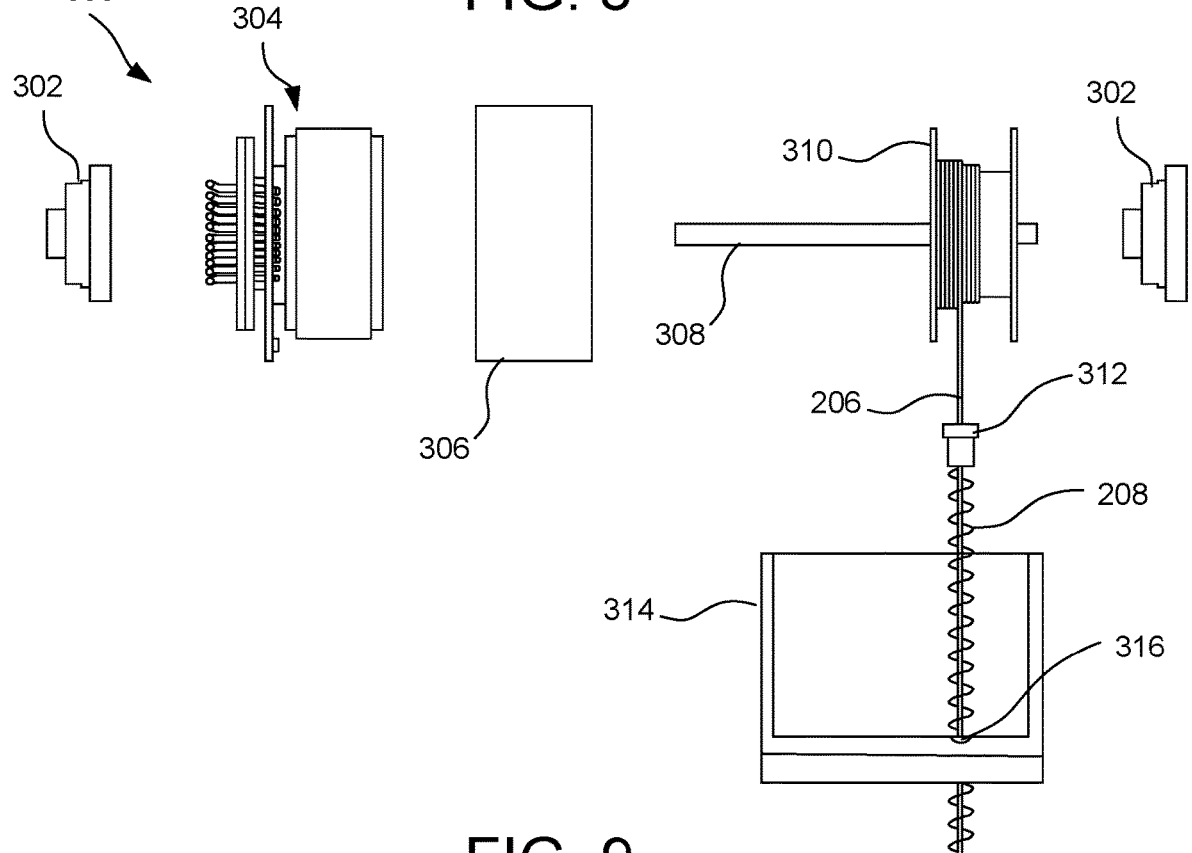
FIG. 9 depicts an exploded view of a drivetrain or power take-out (PTO) unit, according to one or more embodiments of the present disclosure.

FIG. 9 depicts an exploded view of the PTO unit 300 to better illustrate the various parts.

Figure 10:
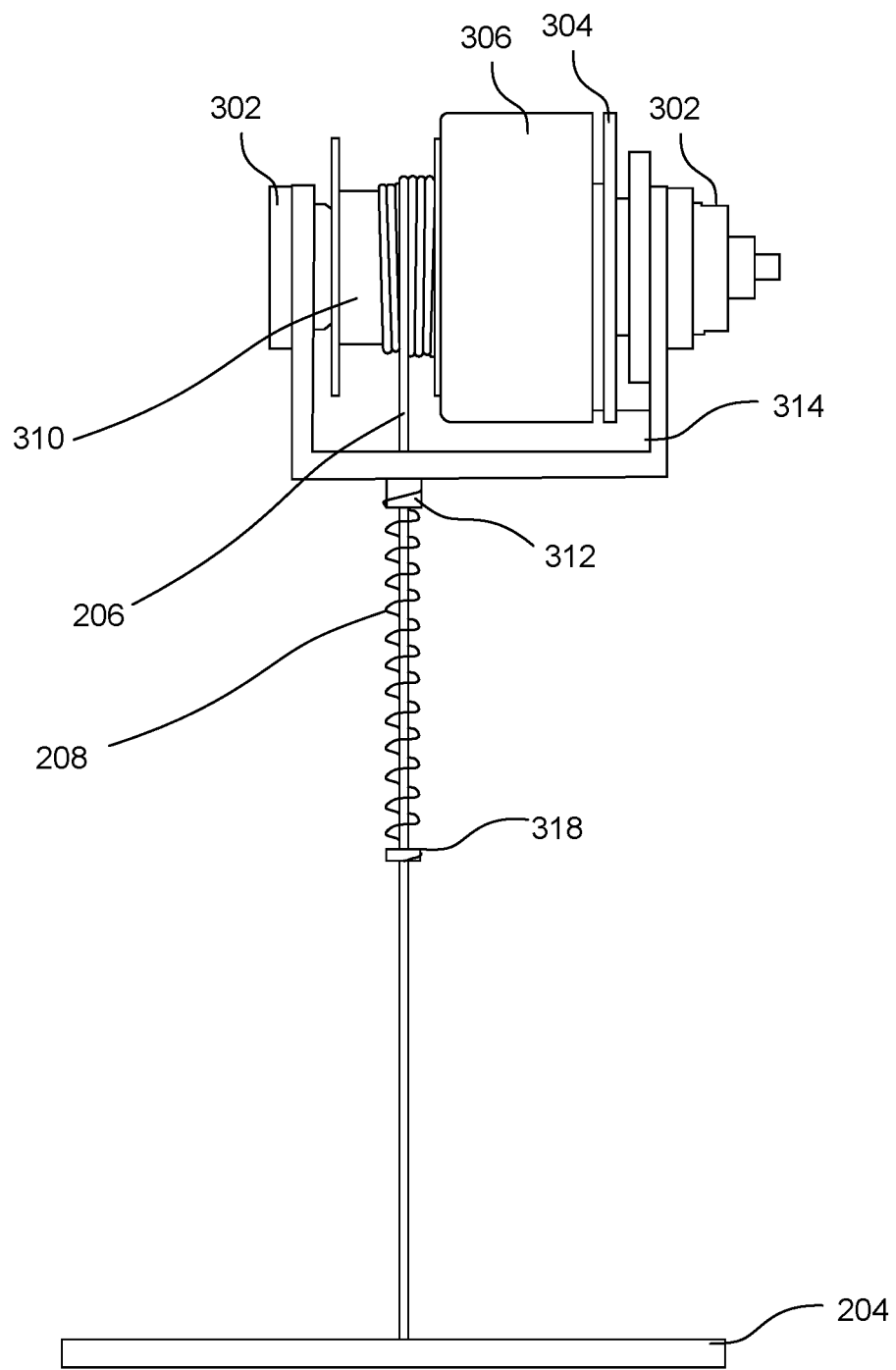
FIG. 10 depicts an reaction structure and tendon-spring coupling along with drivetrain, according to one or more embodiments of the present disclosure.

FIG. 10 depicts another view with the reaction structure 204 and the tendon-spring coupling 318. The tendon will only be able to rotate the drum while the two bodies are moving away from each other, so to ensure that the line always remains taut, the generator must act as a motor to take up any slack line and keep a small amount of line tension. The energy required to do this will be insignificant relative to that produced while acting as a generator, and so the net energy will not be significantly affected.

The upper end of the spring is firmly attached to the fairlead while the lower end is attached to a point on the tendon. However, in some embodiments, the fairlead is not firmly attached to the support structure, and it can be released freely. As such, the fairlead and spring are effectively 'floating' and can be wound around the drum with the tendon, allowing the tendon to be fully 'wound-in' so the reaction structure can be secured against the body of the float when used in a two-body system. From the fully retracted state, the generator would rotate the drum, unwinding the tendon and spring through a hole in the support structure. When the fairlead gets to this hole, a flange on the fairlead prevents it from passing completely through the hole, and the spring will start to extend until the full weight of the reaction structure is supported by the spring. At this point, the generator will stop lowering and switch to a generating mode. Recovery would simply be the opposite with the generator acting as a motor to wind the reaction structure up. This functionality may be of particular import in certain WEC embodiments that would deploy a reaction structure only occasionally to generate power. This functionality is enabled as a result of the tendon passing directly through the center of the spring.

There are WEC types that may not need the retraction functionality. In such embodiments where the reaction structure is permanently deployed, the fairlead could be firmly attached to the support structure.

The described approach is scalable to both small and large AUVs and the power produced will scale roughly with Froude scaling ($\gamma^{3.5}$) A small AUV with around 9 kg displacement could produce around 5 W, while an AUV that is twice as large (such as a REMUS 100) may produce >10 times more power (over 50 W) and one that is 4 times as large (such as a Bluefin 21) may produce over 128 times more power (i.e. over 0.5 kW).

Methods of deploying a reaction structure 204 are also contemplated herein in addition to utilize an extension spring to.

Embodiments of components of the systems described herein might be coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Additionally, some or all of the functionality described herein might be implemented via one or more controllers, processors, or other computing devices. For example, a controller might be implemented to control the mooring lines, the tether(s) or tendon(s), or modes of the system.

In the above description, specific details of various embodiments are provided. However, some embodiments may be practiced with less than all of these specific details.

In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for harnessing wave energy in a body of water, the system comprising:
   a float,
   wherein the float comprises a drivetrain having a support structure;
   a reaction structure coupled to the drivetrain by a tendon, the reaction structure being configured to deploy in the body of water at a depth below the float;
   an extension spring having a first end coupled to a fixed point on the tendon and a second end configured to be disposed at a fixed location relative to the drivetrain, wherein the fixed point on the tendon is between where the tendon is coupled to the drivetrain and where the tendon is coupled to the reaction structure, and
   a fairlead, wherein the extension spring is coupled directly to the fairlead at the second end of the extension spring, the fairlead being a mechanical structure with a flange configured to prevent the fairlead from passing outside the support structure of the drivetrain and configured to couple the second end of the extension spring to the fixed location;
   wherein the float and the reaction structure will oscillate relative to each other around an equilibrium point of the extension spring, and
   wherein the extension spring is configured to experience an elastic force in response to tension on the first end of the extension spring away from the drivetrain.

2. The system of claim 1, further comprising a tendon-spring coupling attaching the tendon to the extension spring at the fixed point.

3. The system of claim 1, wherein the fairlead is configured to be fully retractable into the float when the tendon retracts.

4. The system of claim 1, wherein the tendon is configured to wrap around a drum in the float.

5. The system of claim 4, wherein the spring is configured to wrap around the drum in the float when the tendon retracts.

6. The system of claim 1, wherein the float is an unmanned underwater vehicle (UUV).

7. The system of claim 6, wherein the UUV is an autonomous underwater vehicle (AUV).

* * * * *